US012613775B2

(12) United States Patent
Yang et al.

(10) Patent No.: US 12,613,775 B2
(45) Date of Patent: Apr. 28, 2026

(54) DECODING OPERATIONS ASSOCIATED WITH ESTIMATED ERROR RATES

(71) Applicant: Microchip Technology Incorporated, Chandler, AZ (US)

(72) Inventors: Nian Niles Yang, Mountain View, CA (US); Pitamber Shukla, San Jose, CA (US); Murthy Hari, San Jose, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 4 days.

(21) Appl. No.: 18/751,185

(22) Filed: Jun. 21, 2024

(65) Prior Publication Data

US 2025/0265150 A1 Aug. 21, 2025

Related U.S. Application Data

(60) Provisional application No. 63/554,158, filed on Feb. 15, 2024.

(51) Int. Cl.
*G06F 11/00* (2006.01)
*G06F 11/07* (2006.01)
*G06F 11/10* (2006.01)

(52) U.S. Cl.
CPC ........ *G06F 11/1068* (2013.01); *G06F 11/076* (2013.01); *G06F 11/106* (2013.01)

(58) Field of Classification Search
CPC .. G06F 11/1068; G06F 11/076; G06F 11/106; G06F 11/00; G06F 2201/81
See application file for complete search history.

(56) References Cited

U.S. PATENT DOCUMENTS

| | | | | |
|---|---|---|---|---|
| 10,114,693 B2 * | 10/2018 | Kim | .................... | H03M 13/353 |
| 10,256,844 B2 | 4/2019 | Hsiao et al. | | |
| 10,431,324 B2 * | 10/2019 | Kim | ................. | H03M 13/2912 |
| 11,086,716 B2 | 8/2021 | Grauman | | |
| 11,281,533 B2 * | 3/2022 | Tai | ...................... | G06F 11/1076 |
| 12,250,004 B2 * | 3/2025 | Kil | ...................... | G06F 11/1004 |
| 12,273,127 B2 * | 4/2025 | Jang | ................. | H03M 13/3738 |
| 2014/0173382 A1 | 6/2014 | Yang et al. | | |
| 2017/0123898 A1 * | 5/2017 | Ryabinin | .............. | G06F 3/0679 |
| 2019/0097653 A1 | 3/2019 | Zhang et al. | | |
| 2024/0030938 A1 | 1/2024 | Wang | | |

OTHER PUBLICATIONS

International Search Report and Written Opinion, PCT Application No. PCT/US2024/042588, mailed Dec. 2, 2024, 12 pages.

* cited by examiner

*Primary Examiner* — Esaw T Abraham
(74) *Attorney, Agent, or Firm* — Onyx IP Group

(57) ABSTRACT

In some implementations, a controller may initiate a read operation associated with a storage medium. The controller may identify a first estimation of a first expected error rate for a first data set stored on the storage medium and a second estimation of a second expected error rate for a second data set stored on the storage medium. The controller may perform a first decoding operation on the first data set based at least in part on the first expected error rate. The controller may perform a second decoding operation on the second data set based at least in part on the second expected error rate.

20 Claims, 6 Drawing Sheets

100

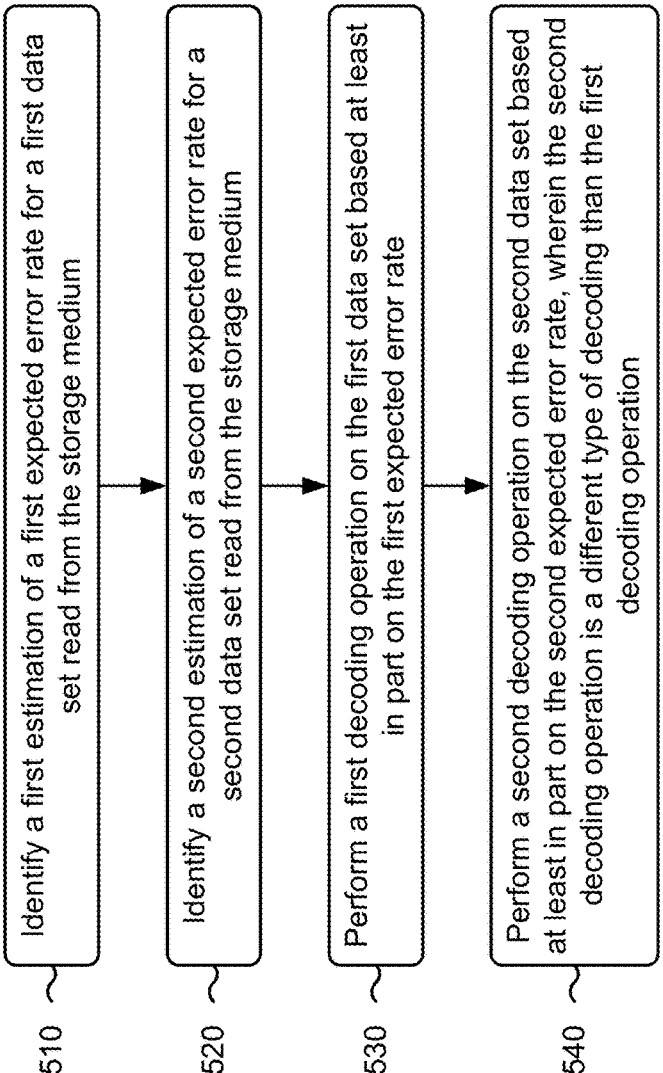

510 Identify a first estimation of a first expected error rate for a first data set read from the storage medium 520 Identify a second estimation of a second expected error rate for a second data set read from the storage medium 530 Perform a first decoding operation on the first data set based at least in part on the first expected error rate 540 Perform a second decoding operation on the second data set based at least in part on the second expected error rate, wherein the second decoding operation is a different type of decoding than the first decoding operation

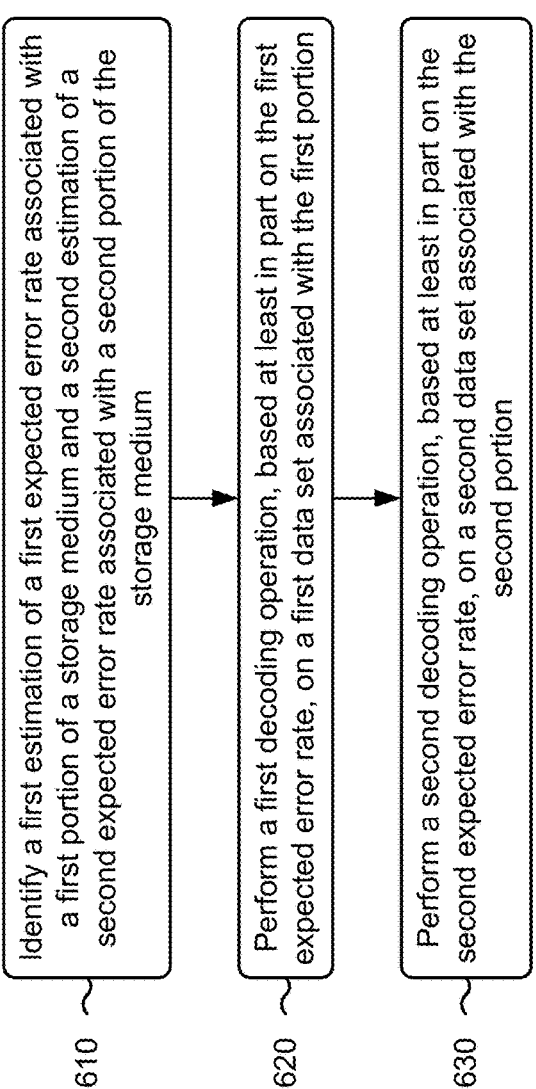

Identify a first estimation of a first expected error rate associated with a first portion of a storage medium and a second estimation of a second expected error rate associated with a second portion of the storage medium

610

Perform a first decoding operation, based at least in part on the first expected error rate, on a first data set associated with the first portion

620

Perform a second decoding operation, based at least in part on the second expected error rate, on a second data set associated with the second portion

DECODING OPERATIONS ASSOCIATED WITH ESTIMATED ERROR RATES

RELATED APPLICATION

This application claims priority to U.S. Provisional Patent Application No. 63/554,158 entitled "DECODING OPERATIONS ASSOCIATED WITH ESTIMATED ERROR RATES," filed Feb. 15, 2024, which is incorporated herein by reference in its entirety.

FIELD

The present disclosure generally relates to decoding data within a storage medium based at least in part on expected error rates of the data. In some aspects, a controller may decode different portions of the data based on the different portions being associated with different expected error rates.

BACKGROUND

A non-volatile memory device may include a memory device that may store and retain data without external power supply. One example of a non-volatile memory device is a not-AND (NAND) flash memory device. In some situations, the data may be subject to errors and may be decoded using error correction.

SUMMARY

In some implementations, a method comprises identifying a first estimation of a first expected error rate for a first data set read from the storage medium in response to the initiated read operation, the first estimation based at least in part on a preliminary evaluation of the first data set in connection with an error correction code operation. The method may comprise identifying a second estimation of a second expected error rate for a second data set read from on the storage medium, the second estimation based at least in part on a preliminary evaluation of the second data set in connection with an error correction code operation. The method may comprise performing a first decoding operation on the first data set based at least in part on the first expected error rate. The method may comprise performing a second decoding operation on the second data set based at least in part on the second expected error rate, the second decoding operation being different from the first decoding operation based at least in part on the first expected error rate being different from the second expected error rate.

In some implementations, a system comprises a storage medium of a storage device and a controller associated with the storage medium. The controller is to identify a first estimation of a first expected error rate for a first data set read from the storage medium. The controller is to identify a second estimation of a second expected error rate for a second data set read from the storage medium. The controller is to perform a first decoding operation on the first data set based at least in part on the first expected error rate. The controller is to perform a second decoding operation on the second data set based at least in part on the second expected error rate, wherein the second decoding operation is a different type of decoding than the first decoding operation.

In some implementations, a computer program product comprises one or more computer readable storage media and program instructions collectively stored on the one or more computer readable storage media. The program instructions comprise program instructions to identify a first estimation of a first expected error rate associated with a first portion of a storage medium and a second estimation of a second expected error rate associated with a second portion of the storage medium. The program instructions comprise program instructions to perform a first decoding operation, based at least in part on the first expected error rate, on a first data set associated with the first portion. The program instructions comprise program instructions to perform a second decoding operation, based at least in part on the second expected error rate, on a second data set associated with the second portion.

BRIEF DESCRIPTION OF THE DRAWINGS

FIGS. 4-6 is a flowchart of an example process associated with expected-error-rate-based decoding operations described herein.

DETAILED DESCRIPTION

Figure 1:
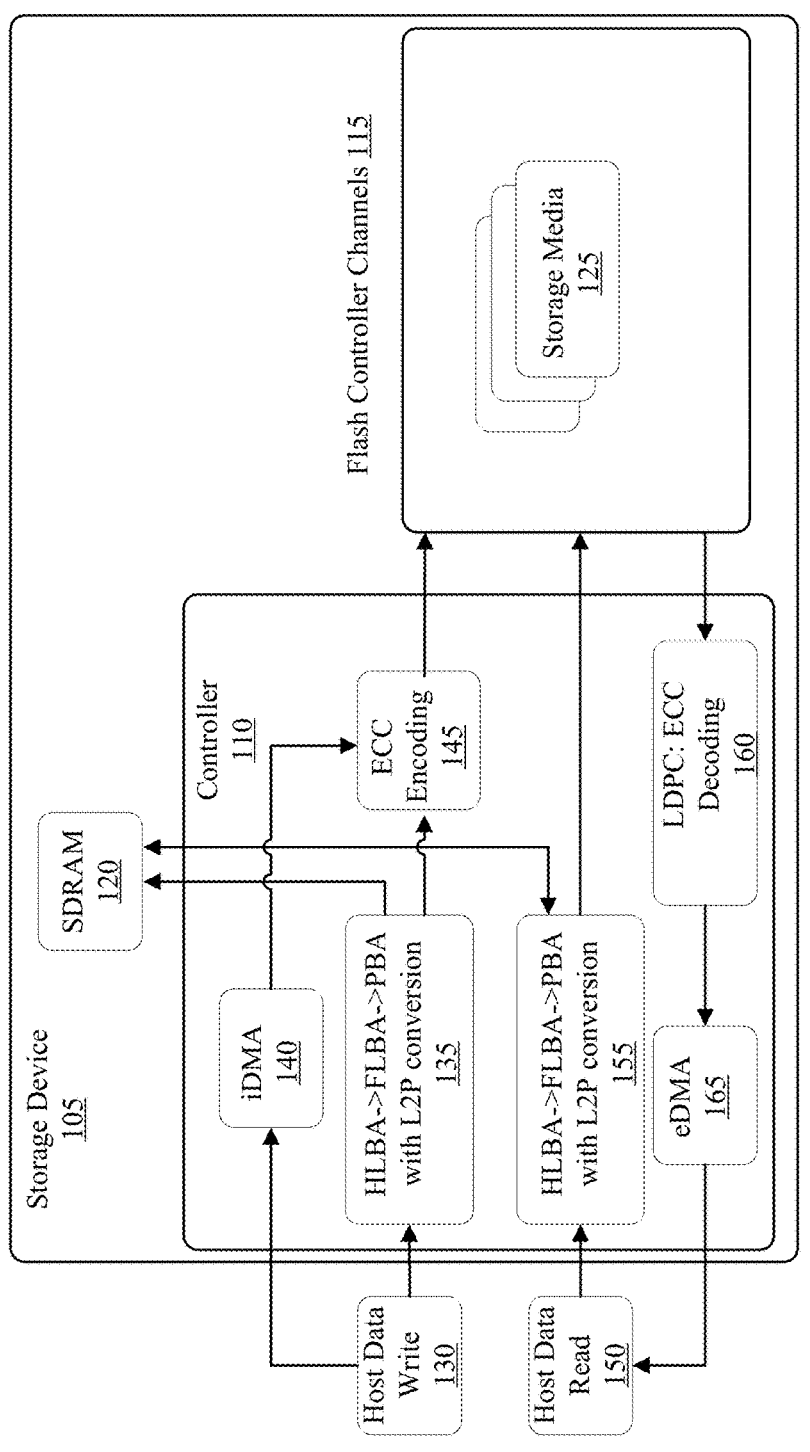
FIG. 1 is a diagram of an example of a device performing expected-error-rate-based decoding operations described herein.

The following detailed description of example implementations refers to the accompanying drawings. The same reference numbers in different drawings may identify the same or similar elements.

A storage device may include a solid-state drive (SSD). In some examples, the storage device, such as an SSD, may include a plurality of non-volatile memory devices, such as NAND flash memory devices, without limitation. A non-volatile memory device may store data that is accessible via a controller. The controller may include one or more of an application specific integrated circuit (ASIC) or firmware.

Data may be stored on a storage device (e.g., a NAND flash memory device) and may be subject to errors. For example, data stored on the storage device may be stored in physical components of transistors or other binary storage units. To store a bit of data (using a write operation) within the storage device, the controller may apply a voltage to a transistor that changes a state of the transistor to be read as a 1 or a 0 when using a read operation to apply a read voltage. The application of voltages in a read operation or a write operation may not be successful, which may cause errors in the data.

Additionally, over time and after numerous program/erase operations and write operations, storage on the storage device may degrade based at least in part on degradation of physical components of the transistors or connected devices. For example, insulating materials, channel materials, gates, or conductive layers may interact to degrade barriers used to form current paths and voltage storage within the storage device.

The controller or other device may perform error correction to correct errors when reading data stored on the storage device before providing the read data to a host device. In some examples, a controller may perform a series of decoding operations on the data, with the decoding operations including a series of error correction code operations. For example, the series of error correction code operations may begin with a first operation of error correction code that has a least complexity, then proceed with progressively more complex operations of error correction codes.

However, error correction code operations create latency in reading the data. To quantify latency, a quality of service (QoS) metric may be used. The QoS metric may be associated with a time limit for a read operation. For example, 99% of read operations may be expected to be completed within 100 microseconds, or 99.999% of read operations may be expected to be completed with 1 millisecond, among other examples.

The latency associated with performing an error correction code operation of a decoding procedure may have a latency of multiple microseconds. For example, if decoding has failed, a read operation may be re-tried and another round of error correction code operation of the decoding procedure may be executed. This decision and re-trial of error correction code decoding may lead to inefficiency of the read operation in general, which may negatively impact the QoS. The negative impact on the QoS may cause the decoding procedure to fail to satisfy a QoS metric.

In some aspects described herein, a controller (e.g., including a low-density parity check (LDPC) engine) may use a decoding procedure with improved intelligence to increase a likelihood of satisfying a QoS metric and conserving power and computing resources of the controller when data is compromised with errors (e.g., with a relatively high density of errors).

In some aspects, the controller may perform an operation to identify an error estimation of data (e.g., a syndrome weight) before attempting to decode the data obtained from a read operation. For example, data may be shown to be poor based at least in part on having a number of errors that satisfy a threshold or an associated error rate that is estimated to satisfy a threshold (e.g., beyond or exceeding the threshold). If data is shown to be poor, one or more decoding operations (e.g., most simple or least robust of a set of candidate decoding operations) will not be performed. In this way, the controller may skip decoding operations that are unlikely to be successful, may improve a likelihood of satisfying a QoS metric, and may conserve computing and power resources that may have otherwise been used to perform the skipped decoding operations.

In some aspects, in addition to skipping the decoding operations that are unlikely to be successful, other corrective operations may be used to recover the data. For example, new read levels may be used to re-read the data from the storage device, or a softbit read (e.g., a read that includes multiple sensing results to obtain a result to compare for a bit value) may be used to re-read the data from the storage device.

In some aspects, a controller associated with a storage medium may decode a first portion of the data using a first decoding operation based on a first expected error rate associated with the first portion and may decode a second portion of the data using a second decoding operation on the second portion of the data based on a second expected error rate associated with the second portion, wherein the first decoding operation is different from the second decoding operation and the first portion is different from the second portion.

In some aspects, a read error handling algorithm may use an error estimation (e.g., a syndrome weight that includes an estimated error rate that is based at least in part on a preliminary evaluation of the data) capability of the controller to prevent performing a decoding operation that is expected to fail. The time saved (by not performing the decoding operation) may be used to handle further read error handling operations on the data associated with the error estimation or another set of data. This may improve the QoS.

In some aspects, the storage device may use a first expected error rate of a first data set and a second expected error rate of a second data set to prioritize read operations. For example, the storage device may identify the first data set as being unlikely to be successfully decoded (e.g., decoding in satisfaction of a QoS latency requirement), and may instead prioritize decoding of the second data set based at least in part on the second data set having a higher likelihood of successful decoding than the first data set. Conversely, the storage device may identify the second data set as being unlikely to be successfully decoded and may instead prioritize decoding the first data set or a third data set.

In some aspects, the first data set may be on a same storage medium (e.g., a flash memory device or NAND, among other examples) as the second data set. In this case, reading the first data set and the second data set may compete for resources or priority (latency). In some aspects, the first data set may be on a different storage medium than the second data set. In this case, reading the first data set and the second data set may compete for resources or priority, or may be associated with different channels of the storage device.

FIG. 1 is a diagram of an example 100 of a device performing expected-error-rate-based decoding operations described herein. Example 100 describes components and operations associated with a storage device 105. In some aspects, the storage device 105 may include a solid state drive (SSD) or another type of storage device. As shown in FIG. 1, the storage device 105 may include a controller 110, flash controller channels 115 that include storage media 125, and synchronous dynamic random access memory (SDRAM) 120. In some aspects, the SDRAM 120 may provide a relatively small amount of storage (e.g., gigabytes of storage) to be accessed by the controller 110 to operate the storage device 105. In some aspects, the flash controller channels 115 may be used to store a relatively large amount of data (e.g., terabytes of storage). The storage device 105 may store host data on the storage media 125.

As shown by reference number 130, the storage device 105 may receive host data for a write operation. For example, a host (e.g., a host device not shown) may provide the host data with a command to write to a storage medium. As shown by reference number 140, the storage device 105 may process the host data via an ingress direct memory access (iDMA) operation in preparation for storage to the storage media 125.

The storage device 105 may identify a host logical block address (HLBA) associated with the host data by which the host may reference the host data in a future read operation. As shown by reference number 135, the storage device may convert the HLBA to a flash logical block address (FLBA) or other local logical block address, and then may link the FLBA to a physical block address (PBA) using logical to physical (L2P) conversion. In this way, the host may send a static address associated with the host data, the storage device 105 may link the address known to the host to an address known to the storage device (the FLBA), and may link the address known to the storage device to a physical address of the host data within the storage medium. The storage device 105 may store the links between the HLBA, the FLBA, and the PBA in the SDRAM 120. In some aspects, the host data may be moved within a storage medium of the storage media 125 or between a first storage medium and a second storage medium of the storage media 125, which the storage device 105 may note in the link between the FLBA and the physical location. In this way, the HLBA does not need to be updated when the host data is moved to a new PBA.

As shown by reference number 145, the storage device 105 may perform error correction code encoding on the host data. For example, the controller 110 may include an error code encoder that performs the error correction code encoding. In some aspects, the error correction code encoding may include adding redundancy, parity bits, or other information that can later be used to identify errors in the host data when read from the storage medium. The storage device 105 may provide the host data, after encoding, via the flash control channels 115 to write on the storage media 125.

As shown by reference number 150, the storage device 105 may receive a request from a host to read data from the storage medium. For example, the host may provide a request to read the host data that was provided for writing in connection with reference number 130. As shown by reference number 155, the storage device 105 may perform HLBA to FLBA to PBA conversion. For example, the controller 110 may identify the HLBA in the request and may provide the HLBA to the SDRAM 120 to identify the FLBA or the PBA. The SDRAM may have stored the link between the HLBA to the PBA in connection with a previous write command.

Once the PBA is identified in connection with the request, the controller 110 may read the storage media 125 via the flash controller channels 115 at the PBA. For example, the controller 110 may obtain sensing results at the PBA. As shown by reference number 160, the controller 110 may perform low density parity check LDPC decoding, such as error correction code decoding. The decoding process may include performing hardbit decoding on the sensing results. Hardbit decoding may include comparing a sensed voltage value with a threshold to determine a bit value of one or more transistors or cell groups. For example, the controller 110 may perform a hardbit read that is a single pass read operation, after which the controller performs hardbit decoding using the output of the hardbit read. Hardbit decoding may include error correction with relatively low complexity and a relatively high success rate in error correction. If the hardbit decoding fails (e.g., errors remain after hardbit decoding and error correction), the controller 110 may perform softbit decoding on the sensing results.

Softbit decoding may include using sensed voltage values of one or more transistors to identify a likelihood of values for each bit value of the sensed voltages. For example, a softbit read may include multiple (e.g., 2 or 4) reads of a storage medium, after which the controller performs softbit decoding using the output of the softbit read. Softbit values may support increased error correction at the expense of increased complexity and consumption of computing resources. If a first softbit decoding fails, the controller 110 may perform a second softbit decoding on the sensing results, with the second softbit decoding having increased complexity and consumption of computing resources relative to the first softbit decoding.

In some aspects described herein, the controller 110 may perform an estimation of an error rate of the sensing results before performing one or more of the hardbit decoding or the softbit decoding. For example, an LDPC engine may, before any decoding, identify a quantity of mismatches (e.g., errors identified with parity bits) without identifying exact locations of the mismatches. For example, the controller 110 may determine a syndrome weight that includes an estimated error rate that is based at least in part on a preliminary evaluation of the data.

In some aspects, to perform the estimation of the error rate before performing hardbit decoding or softbit decoding, the controller 110 may perform a preliminary estimation of the error rate based at least in part on characteristics of a region of the storage media 125 associated with data to be read. For example, the region may be associated with an expected error rate that is based at least in part on one or more of a history of error rates at the region, a history of error rates at a location that is physically near the region, a temperature condition, a quantity of program-erase cycles performed at the location, or a storage medium of the region, among other examples. In some aspects, the controller may identify an expected error rate based at least in part on two or more characteristics. In some aspects, the controller may store a list of expected error rates for different regions of the storage media 125. For example, the controller may store the list of expected error rates in volatile memory (e.g., the SDRAM 120).

In some aspects, the controller 110 may perform a preliminary estimation of the error rate based at least in part on an initial scan of the sensing results (e.g., as a part of a hardbit read) before attempting to correct errors. In some aspects, the preliminary estimation may be based at least in part on output of an LDPC decoding computation engine that provides first order detection of a quantity of expected bit errors. In some aspects, the preliminary estimation does not indicate where the expected bit errors are located (e.g., within a codeword of the data), and the preliminary estimation is a low-latency computation. For example, the preliminary estimation may be a syndrome weight that includes an estimated error rate that is based at least in part on a preliminary evaluation of the data. For example, the controller 110 may identify a quantity of errors based at least in part on evaluating parity bits. In some examples, the controller may organize sensing results into rows and columns, with a parity bit used to indicate whether an error exists in a dimension (e.g., in a row or a column). The initial scan may include identifying a quantity of columns or errors having an error based at least in part on whether the columns or errors have parity (e.g., using the parity bits).

Based at least in part on the estimation of the error rate, the controller 110 may select a decoding operation associated with the estimation of the error rate. For example, a first range of expected error rates (e.g., a range that exists below a first threshold) may be associated with a hardbit decoding operation, a second range of expected error rates (e.g., a range that exists between the first threshold and a second threshold) may be associated with a hardbit decoding operation and marking the associated data for read scrubbing, a third range of expected error rates (e.g., a range that exists between the second threshold and a third threshold) may be associated with a first softbit decoding operation, or a fourth range of expected error rates (e.g., a range that exists above the third threshold) may be associated with second softbit decoding operation, with the second softbit decoding having increased complexity and consumption of computing resources relative to the first softbit decoding. In this way, the controller 110 may skip hardbit decoding or a first softbit decoding if those operations are unlikely to successfully decode the host data associated with the read request. This may allow the storage device 105 to conserve computing resources and improve latency of this read operation as well as other operations performed at the controller 110 that may have otherwise been delayed until after this read operation.

As shown by reference number 165, the controller 110 may perform egress direct memory access (eDMA) to isolate the host data of the request for sending to the host.

For example, an eDMA controller (e.g., eDMA engine) may perform eDMA to isolate data to be delivered to the host in association with the read request. In some aspects, the host may send multiple read requests to the storage device 105 and eDMA may be used to isolate a portion of read data that is to be provided to the host for a specific read request. In some examples, the eDMA controller may have access to a number of the flash controller channels 115. In some aspects, the flash controller channels 115 may be used in parallel so the eDMA may perform multiple commands via multiple flash controller channels 115.

The number and arrangement of components shown in FIG. 1 are provided as an example.

Figure 2:
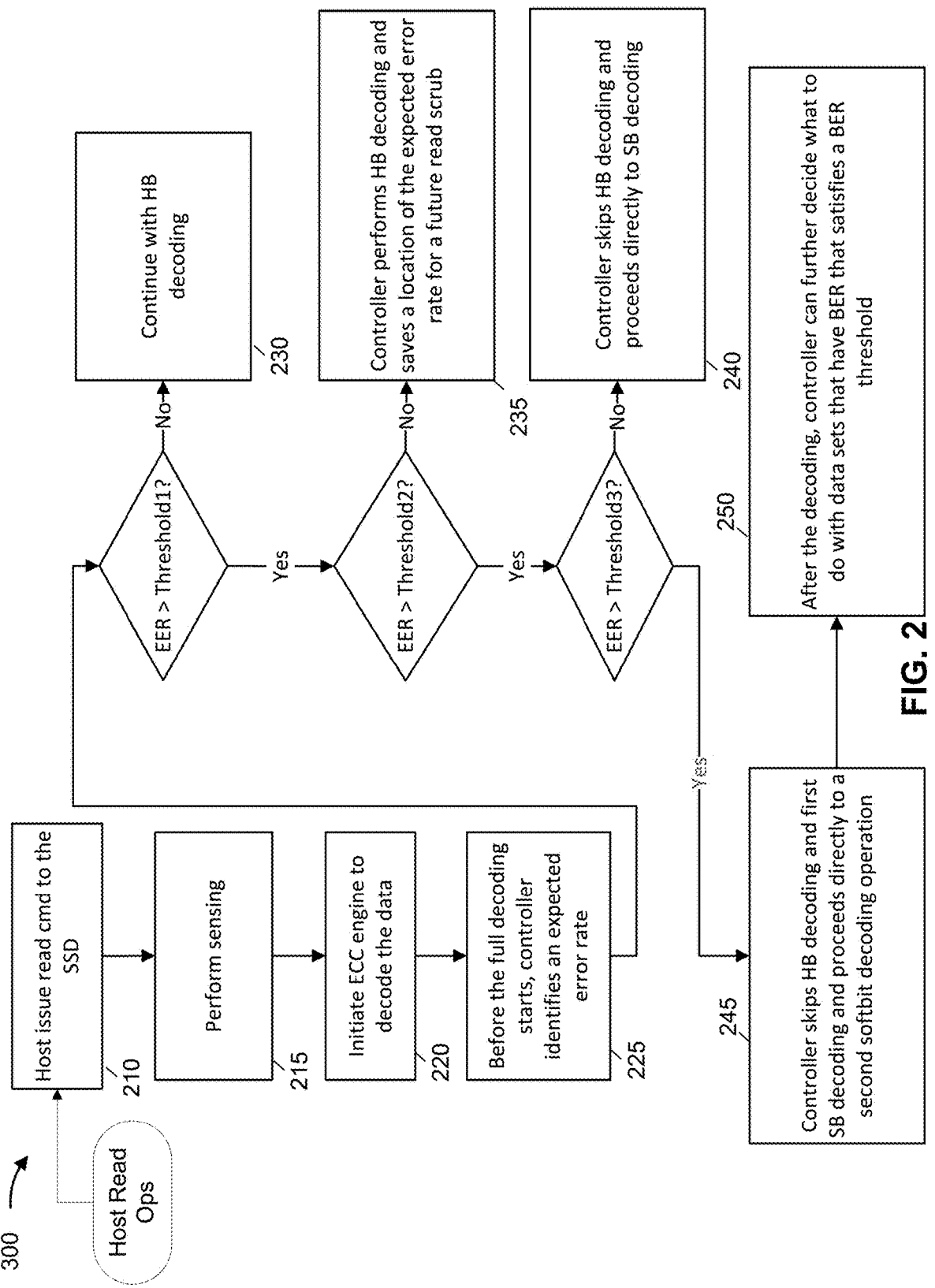
FIG. 2 is a flow chart of an example of expected-error-rate-based decoding operations described herein.

FIG. 2 is a diagram of an example 200 of expected-error-rate-based decoding operations described herein. The operations described in connection with example 200 may be performed by one or more of a controller (e.g., controller 110) or a host device, among other examples. Although described in connection with FIG. 2 as an SSD, other storage devices are intended to be interchangeable in the context of the described aspects and examples.

As shown in FIG. 2, a host device may initiate a read operation. For example, the host device may issue a read command to the SSD (e.g., or other type of storage device) (Block 210). The SSD may perform sensing to obtain samples or readings of data stored on transistors of the SSD (Block 215). For example, the transistors may be memory cells (e.g., NAND flash memory cells). The samples or readings may include errors. For example, the samples or readings may have errors associated with leakage between memory cells, transistors, bitlines, or wordlines. In some aspects, the samples or readings may have errors based at least in part on voltage reads being too close to a threshold for identifying a value of data stored on a transistor. In some aspects, the samples or readings may have errors based at least in part on environmental factors (e.g., temperature, power supply, among other examples), or a life cycle of the storage device (e.g., a quantity of program-erase cycles), among other examples.

A controller of the SSD may initiate an error correction code (ECC) engine to decode data from the results of the sensing (Block 220). Before full decoding starts (e.g., before performing error correction on sensed values), the controller may identify an expected error rate (e.g., bit error rate estimate) of one or more sets of data (e.g., syndrome weights) (Block 225). For example, to perform the estimation of the error rate before performing hardbit decoding or softbit decoding (e.g., before error correction), the controller 110 may perform a preliminary estimation of the error rate based at least in part on characteristics of a region of the storage media 125 associated with data to be read. For example, the region may be associated with an expected error rate that is based at least in part on one or more of a history of error rates at the region, a history of error rates at a location that is physically near the region, a temperature condition, a quantity of program-erase cycles performed at the location, or a storage medium of the region, among other examples. In some aspects, the controller may identify an expected error rate based at least in part on two or more characteristics. In some aspects, the controller may store a list of expected error rates for different regions of the storage media 125. For example, the controller may store the list of expected error rates in volatile memory (e.g., the SDRAM 120). In some aspects, the controller 110 may perform a preliminary estimation of the error rate based at least in part on an initial scan of sensing results (e.g., as a part of a hardbit read) before attempting to correct errors. In this way, the controller may identify a data set that is unlikely to be decoded using a low-complexity decoding operation, such as hardbit decoding, and may instead skip to a more-appropriate decoding operation, such as softbit decoding.

If the expected error rate (EER) for a data set fails to satisfy a first threshold ("Threshold1"), i.e. the EER is not greater than Threshold1, the controller may continue with hardbit (HB) decoding (e.g., a decoding operation performed by the LDPC engine) (Block 230). If the EER fails to satisfy the first threshold, performing HB decoding may be a most efficient way to decode the data, and may conserve computing resources and reduce latency. If the expected error rate satisfies the first threshold, i.e. the EER is greater than Threshold1, but fails to satisfy a second threshold ("Threshold2"), i.e. the EER is not greater than Threshold2, which second threshold is higher than the first threshold, the controller may perform HB decoding and save a location of the expected error rate for a future read scrub (Block 235). In some aspects, based at least in part on the EER not satisfying the second threshold, hardbit decoding may not fail, so the controller may proceed with the hardbit decoding for this read, but record the expected error rate for this location for a future read scrub to improve the data quality and likelihood of success of a subsequent read of the data.

If the expected error rate satisfies the first threshold and the second threshold, i.e. the EER is greater than Threshold1 and greater than Threshold2, but fails to satisfy a third threshold ("Threshold3"), i.e. the EER is not greater than Threshold3, which third threshold is higher than the second threshold, the controller may skip hardbit decoding and may proceed directly to softbit (SB) decoding (e.g., a decoding operation performed by the LDPC engine) (Block 240). In some aspects, based at least in part on satisfying the second threshold, the controller does not perform hardbit decoding and instead performs a first softbit decoding operation without first performing hardbit decoding. Softbit decoding may be performed on first data with poor quality (Block 240) while hardbit decoding may be performed on second data with quality that exceeds that of the first data (e.g., a lower error rate than the first data) (Blocks 230, 235). Bypassing hardbit decoding may conserve power and computing resources associated with the hardbit decoding that is unlikely to be successful.

Although described in connection with FIG. 2 as being greater than a threshold, satisfaction of a threshold may include being greater than or equal to a threshold, being less than or equal to a threshold, or being between two thresholds, among other examples.

If the expected error rate satisfies the first threshold, the second threshold, and the third threshold, the controller may skip hardbit decoding and the first softbit decoding operation and proceed directly to a second softbit decoding operation (Block 245). The second softbit decoding operation has increased complexity, latency, or consumption of computing resources, in comparison with the first softbit decoding operation described in connection with reference number 240. For example, the first softbit decoding operation may use a first quantity of reads (e.g., 2 additional reads relative to the single pass hardbit decoding) and the second softbit decoding operation may use a second quantity of reads (e.g., 4 additional reads relative to the single pass hardbit decoding) that is greater than the first quantity of reads. When performing decoding using hardbit decoding, the controller (e.g., LDPC engine) may compare single read values with a voltage V. When performing decoding using the first softbit decoding, the controller may compare the first softbit reads with voltage thresholds of V− and V+. When performing decoding using the second softbit decoding, the controller may compare the first softbit reads with voltage thresholds of V−−, V−, V+, and V++. In this way, the first softbit decoding operation is more complex than the hardbit decoding operation and the second softbit decoding operation is more complex than the first softbit decoding operation. Bypassing hardbit decoding and the first softbit decoding will save time, power and computing resources associated with hardbit decoding and the first softbit decoding which is expected to fail.

After the second softbit decoding operation (Block 245), the controller may decide what to do with data sets that have a bit error rate (BER) (e.g., an actual bit error rate identified after a selected decoding operation is performed) that satisfies a BER threshold (Block 250), i.e. wherein the BER>BER Threshold. For example, the controller may decide to perform a search scan for finding a hardbit read bias level for read scrubbing or data relocation. Additionally, or alternatively, the controller may decide to perform read scrubbing or data relocation based at least in part on the BERs (e.g., based at least in part on the BER satisfying or being greater than the BER Threshold, or EER being greater than the Threshold1, Threshold2, or Threshold3). Read scrubbing may include reading data from a storage medium, performing error correction, then re-writing the corrected data to an unused block of the storage medium (or another storage medium).

As used herein, satisfaction of a threshold may include being greater than a threshold, greater than or equal to a threshold, being less than a threshold, or being less than or equal to a threshold. For example, satisfaction of a BER threshold by a bit error rate of a data set in context of reference number 250 may include having a BER of the data set that is greater than or equal to the BER threshold error rate, or greater than the threshold error rate. Further, the threshold error rate may be associated with the thresholds of expected error rates for determining a decoding operation for a data set (e.g., Threshold1, Threshold2, or Threshold3). Alternatively, the BER threshold rate may be different or independent from the threshold of the expected error rates for determining the decoding operation for the data set.

In some aspects, the controller may identify BERs of the data sets based at least in part on performing a decoding operation (e.g., the hardbit decoding operation, the first softbit decoding operation, or the second softbit decoding operation, among other examples). The controller may determine that an error rate of a data set satisfies a threshold error rate and, based at least in part on satisfying the threshold error rate, the controller may perform read scrubbing on the data set or mark the data set for read scrubbing at a later time.

The present disclosure identifies appropriate error correction code operations so that a controller may perform decoding with increased complexity (e.g., first softbit or second softbit decoding) and skip lower-complexity decoding that is unlikely to succeed based at least in part on expected error rates, or perform read scrubbing. The present disclosure is directed to making an error correction decision (a starting point for error correction and data management, such as read scrubbing) using expected error rates.

The number and arrangement of components shown in FIG. 2 are provided as an example.

Figure 3:
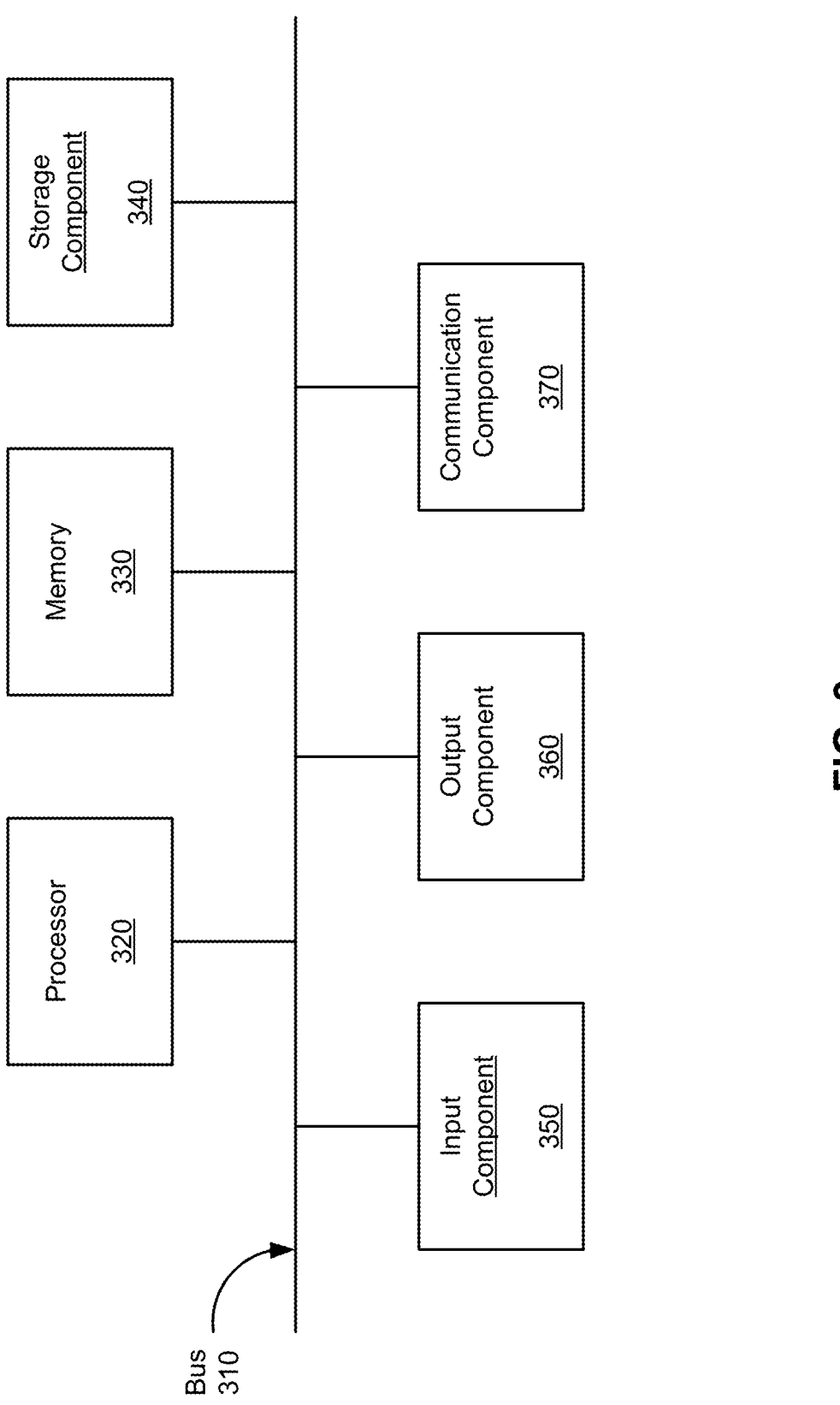
FIG. 3 is a diagram of example components of one or more devices that may be used in connection with FIGS. 1-2.

FIG. 3 is a diagram of example components of a device 300, which may correspond to one or more devices that may be used in connection with FIGS. 1-2, such as a controller. In some implementations, the controller or the host device may include one or more devices 300 and one or more components of device 300. As shown in FIG. 3, device 300 may include a bus 310, a processor 320, a memory 330, a storage component 340, an input component 350, an output component 360, and a communication component 370.

Bus 310 includes a component that enables wired or wireless communication among the components of device 300. Processor 320 includes a central processing unit, a graphics processing unit, a microprocessor, a controller, a microcontroller, a digital signal processor, a field-programmable gate array, an application-specific integrated circuit, or another type of processing component. Processor 320 is implemented in hardware, firmware, or a combination of hardware and software. In some implementations, processor 320 includes one or more processors capable of being programmed to perform a function. Memory 330 includes a random access memory, a read only memory, or another type of memory (e.g., a flash memory, a magnetic memory, or an optical memory). In some implementations, memory 330 may include an ECC engine or an LDPC engine, described above. In this case, memory 330 may be an ecosystem of its own with its own processor(s), controller, LDPC engine, and storage media such as NAND.

Storage component 340 (e.g., storage device 105) stores information or software related to the operation of device 300. For example, storage component 340 may include a hard disk drive, a magnetic disk drive, an optical disk drive, a solid state disk drive, a compact disc, a digital versatile disc, or another type of non-transitory computer-readable medium. In some implementations, storage component 340 may include an ECC engine or an LDPC engine, described above. In this case, storage component 340 may be an ecosystem of its own with its own processor(s), controller, LDPC engine, and storage media such as NAND.

Input component 350 enables device 300 to receive input, such as user input or sensed inputs. For example, input component 350 may include a touch screen, a keyboard, a keypad, a mouse, a button, a microphone, a switch, a sensor, a global positioning system component, an accelerometer, a gyroscope, or an actuator. Output component 360 enables device 300 to provide output, such as via a display, a speaker, or one or more light-emitting diodes. Communication component 370 enables device 300 to communicate with other devices, such as via a wired connection or a wireless connection. For example, communication component 370 may include a receiver, a transmitter, a transceiver, a modem, a network interface card, or an antenna.

Device 300 may perform one or more processes described herein. For example, a non-transitory computer-readable medium (e.g., memory 330 or storage component 340) may store a set of instructions (e.g., one or more instructions, code, software code, or program code) for execution by processor 320. Processor 320 may execute the set of instructions to perform one or more processes described herein. In some implementations, execution of the set of instructions, by one or more processors 320, causes the one or more processors 320 or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
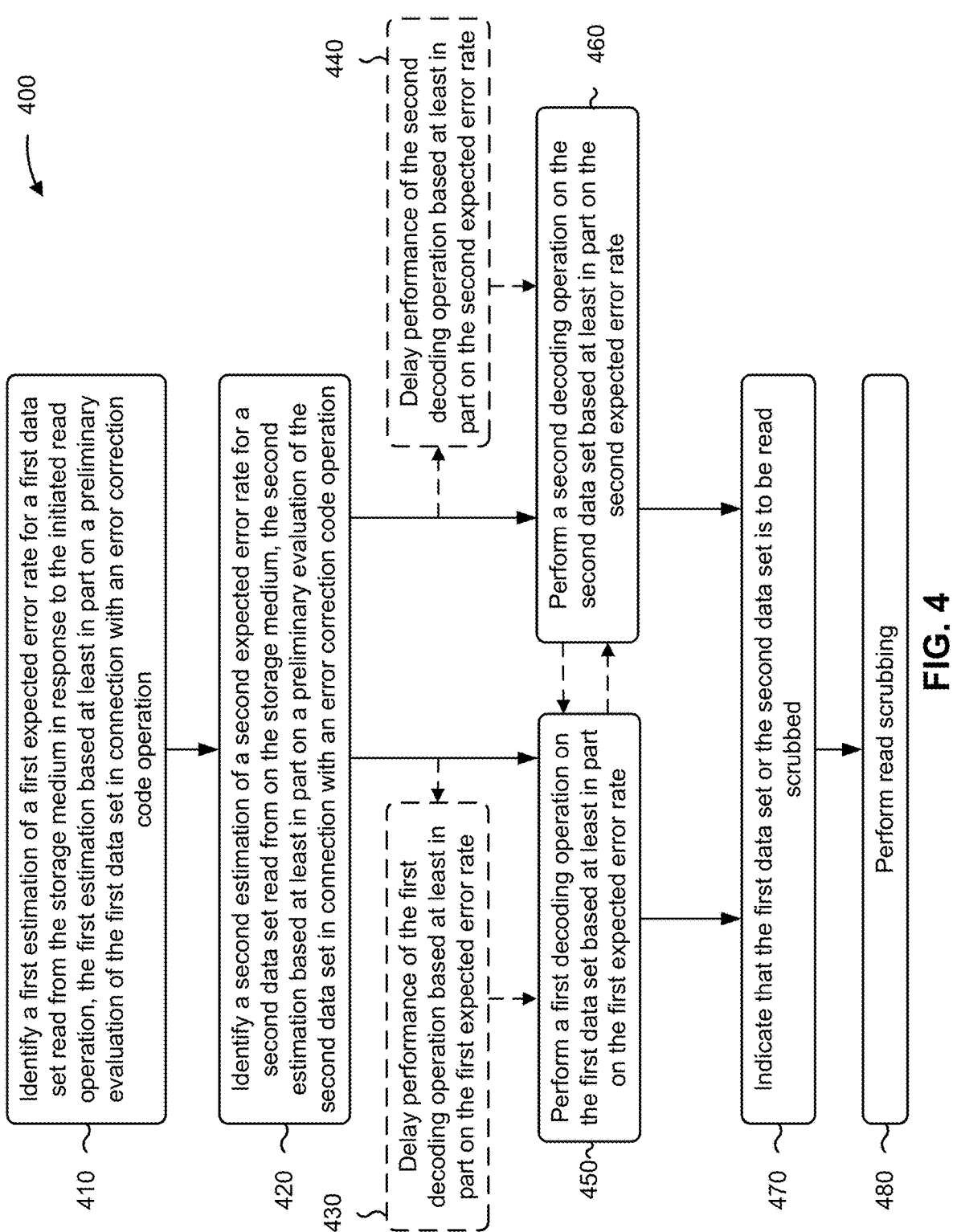

FIG. 4 is a flowchart of an example process 400 associated with decoding operations associated with expected-error-rate-based decoding operations described herein. In some implementations, one or more process blocks of FIG. 4 may be performed by a storage device (e.g., storage device 105). In some implementations, one or more process blocks of FIG. 4 may be performed by another device or a group of devices separate from or including the storage device, such as a controller (e.g., controller 110). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include identifying a first estimation of a first expected error rate for a first data set read from the storage medium in response to the initiated read operation, the first estimation based at least in part on a preliminary evaluation of the first data set in connection with an error correction code operation (block 410). For example, the storage device may identify a first estimation of a first expected error rate for a first data set read from the storage medium in response to the initiated read operation, the first estimation based at least in part on a preliminary evaluation of the first data set in connection with an error correction code operation, as described above.

As further shown in FIG. 4, process 400 may include identifying a second estimation of a second expected error rate for a second data set read from on the storage medium, the second estimation based at least in part on a preliminary evaluation of the second data set in connection with an error correction code operation (block 420). For example, the storage device may identify a second estimation of a second expected error rate for a second data set read from on the storage medium, the second estimation based at least in part on a preliminary evaluation of the second data set in connection with an error correction code operation, as described above.

As further shown in FIG. 4, process 400 may include delaying performance of the first decoding operation on the first data set, relative to the second decoding operation, based at least in part on the first expected error rate (block 430). For example, the storage device may delay performance of the first decoding operation on the first data set, relative to the second decoding operation, based at least in part on the first expected error rate. The storage device may delay performance of the first decoding operation based at least in part on a determination that the first decoding operation is unlikely to successfully decode the first data set in connection with a latency metric associated with a request for the first data set. The storage device may determine to delay the first decoding operation until after performing one or more other decoding operations (e.g., the second decoding operation) that are likely to be successful (e.g., successful in meeting one or more metrics such as QoS or latency, but only if the storage device skips the first decoding operation). In this way, the storage device may determine that a first data set is unlikely to be successfully decoded in connection with a metric and may delay the first decoding operation because the decoding of the first data set is unlikely to be successful anyway. This may support successful decoding using the one or more other decoding operations (e.g., on one or more other data sets) because they are performed without waiting for the first decoding operation. Although decoding of the first data set still failed the metric, delaying the first decoding operation supports successful decoding (e.g., in connection with a metric) of the one or more other data sets. In some aspects, the first data set may be decoded after performing the one or more other decoding operations. This may support a determination of an actual bit error rate of the first data set. Further, this may support a read scrubbing operation to move the first data set, after error correction, to another location of the storage media.

Additionally, or alternatively, the storage device may delay the first decoding operation, even if likely to be successful, if performing the first decoding operation is likely to result in one or more other decoding operations to fail a metric (e.g., in connection with a QoS metric or latency metric, without limitation). For example, if the first decoding operation is a high-complexity softbit decoding operation, performance of the first decoding operation may cause subsequent decoding operations to fail a QoS requirement or latency requirement based at least in part on a latency of performing the high-complexity softbit decoding operation. In this way, and based at least in part on using the expected error rate to identify a decoding operation that is likely to be used for successful decoding, the storage device may prioritize one decoding operation over another to satisfy QoS or latency metrics.

As further shown in FIG. 4, process 400 may include delaying performance of the second decoding operation on the second data set, relative to the first decoding operation, based at least in part on the second expected error rate (block 440). For example, the storage device may delay performance of the second decoding operation on the second data set, relative to the first decoding operation, based at least in part on the second expected error rate. The storage device may delay performance of the second decoding operation based at least in part on a determination that the second decoding operation is unlikely to successfully decode the second data set in connection with a latency metric associated with a request for the second data set. The storage device may determine to delay the second decoding operation until after performing one or more other decoding operations (e.g., the first decoding operation) that are likely to be successful (e.g., successful in meeting one or more metrics such as QoS or latency, but only if the storage device skips the second decoding operation). Additionally, or alternatively, the storage device may delay the second decoding operation, even if likely to be successful, if performing the second decoding operation is likely to result in one or more other decoding operations to fail a metric (e.g., in connection with a QoS metric or latency metric, without limitation). For example, if the second decoding operation is a high-complexity softbit decoding operation, performance of the second decoding operation may cause subsequent decoding operations to fail a QoS requirement or latency requirement based at least in part on a latency of performing the high-complexity softbit decoding operation. As described above, based at least in part on using the expected error rate to identify a decoding operation that is likely to be used for successful decoding, the storage device may prioritize one decoding operation over another to satisfy QoS or latency metrics.

As further shown in FIG. 4, process 400 may include performing a first decoding operation on the first data set based at least in part on the first expected error rate (block 450). For example, the storage device may perform a first decoding operation on the first data set based at least in part on the first expected error rate, as described above.

As further shown in FIG. 4, process 400 may include performing a second decoding operation on the second data set based at least in part on the second expected error rate (block 460). For example, the storage device may perform a second decoding operation on the second data set based at least in part on the second expected error rate, the second decoding operation being different from the first decoding operation based at least in part on the first expected error rate being different from the second expected error rate, as described above. As shown in FIG. 4, the first decoding operation may be performed before the second decoding operation based at least in part on one or more of the first expected error rate or the second expected error rate. Alternatively, the second decoding operation may be performed before the first decoding operation based at least in part on one or more of the first expected error rate or the second expected error rate.

As further shown in FIG. 4, process 400 may include indicating that the first data set or the second data set is to be read scrubbed based at least in part on performing the first decoding operation or the second decoding operation (block 470). For example, the storage device may indicate that the first data set or the second data set is to be read scrubbed based at least in part on performing the first decoding operation or the second decoding operation, as described above.

As further shown in FIG. 4, process 400 may include performing read scrubbing on the first data set based at least in part on satisfaction of a threshold error rate by a first error rate of the first data set, or performing read scrubbing on the second data set based at least in part on a satisfaction of the threshold error rate by a second error rate of the second data set (block 480). For example, the storage device may perform read scrubbing on the first data set based at least in part on satisfaction of a threshold error rate by a first error rate of the first data set, or performing read scrubbing on the second data set based at least in part on a satisfaction of the threshold error rate by a second error rate of the second data. For example, the threshold error rate may be associated with Threshold1, Threshold2, or Threshold3 described in connection with FIG. 2 (e.g., a threshold for actual bit errors that is associated with a threshold for expected error rates). In some aspects, the threshold error rate may be a different threshold that is associated with triggering read scrubbing.

Process 400 may include additional implementations, such as any single implementation or any combination of implementations described below and/or in connection with one or more other processes described elsewhere herein.

In a first implementation, the first decoding operation is associated with a first amount of decoding time or first complexity, and the second decoding operation is associated with a second amount of decoding time or second complexity.

In a second implementation, alone or in combination with the first implementation, the first expected error rate satisfies a first threshold, and the second expected error rate satisfies a second threshold.

In a third implementation, alone or in combination with one or more of the first through second implementations, the first decoding operation and the second decoding operation are selected from a set of multiple candidate decoding operations.

In a fourth implementation, alone or in combination with one or more of the first through third implementations, the storage medium is associated with an SSD.

In a sixth implementation, alone or in combination with one or more of the first through third implementations, process 400 includes providing the data to an associated host device after decoding.

In a seventh implementation, alone or in combination with one or more of the first through sixth implementations, process 400 includes performing a third decoding operation on a third data set before the second decoding operation of the third data set based at least in part on the second expected error rate. In some aspects, the third data set may be associated with an expected error rate that is less than the second expected error rate.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 associated with expected-error-rate-based decoding operations described herein. In some implementations, one or more process blocks of FIG. 5 may be performed by a storage device (e.g., storage device 105). In some implementations, one or more process blocks of FIG. 5 may be performed by another device or a group of devices separate from or including the storage device, such as a controller (e.g., controller 110).

As shown in FIG. 5, process 500 may include identifying a first estimation of a first expected error rate for a first data set read from the storage medium (block 510). For example, the storage device may identify a first estimation of a first expected error rate for a first data set read from the storage medium, as described above.

As further shown in FIG. 5, process 500 may include identifying a second estimation of a second expected error rate for a second data set read from the storage medium (block 520). For example, the storage device may identify a second estimation of a second expected error rate for a second data set read from the storage medium, as described above.

As further shown in FIG. 5, process 500 may include performing a first decoding operation on the first data set based at least in part on the first expected error rate (block 530). For example, the storage device may perform a first decoding operation on the first data set based at least in part on the first expected error rate, as described above.

As further shown in FIG. 5, process 500 may include performing a second decoding operation on the second data set based at least in part on the second expected error rate, wherein the second decoding operation is a different type of decoding than the first decoding operation (block 540). For example, the storage device may perform a second decoding operation on the second data set based at least in part on the second expected error rate, wherein the second decoding operation is a different type of decoding than the first decoding operation, as described above.

Process 500 may include additional implementations, such as any single implementation or any combination of implementations described below and/or in connection with one or more other processes described elsewhere herein.

In a first implementation, performance of the first decoding operation is based at least in part on the range of expected error rates being associated with the first decoding operation. For example, the storage device may perform the first decoding operation if an expected error rate of a data set is within a first range of expected error rates. The range of expected error rates may be defined as being between two threshold expected error rates, less than a smallest threshold expected error rate, or greater than a largest threshold expected error rate. For example, the range of expected error rates may be less than Threshold 1 of FIG. 2, between Threshold1 and Threshold2 of FIG. 2, between Threshold2 and Threshold3 of FIG. 2, between Threshold1 and Threshold3 of FIG. 2, or greater than Threshold3 of FIG. 2.

In a second implementation, alone or in combination with the first implementation, the first expected error rate satisfies a first threshold, and wherein the second expected error rate satisfies a second threshold (e.g., in addition to the first threshold and any other intermediary thresholds).

In a third implementation, alone or in combination with one or more of the first and second implementations, the first decoding operation is associated with a first amount of decoding time or first complexity, and wherein the second decoding operation is associated with a second amount of decoding time or second complexity.

In a fourth implementation, alone or in combination with one or more of the first through third implementations, the first decoding operation and the second decoding operation are selected from a hardbit decoding operation, a first softbit decoding operation, or a second softbit decoding operation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flowchart of an example process 600 associated with expected-error-rate-based decoding operations described herein. In some implementations, one or more process blocks of FIG. 6 may be performed by a storage device ((e.g., storage device 105). In some implementations, one or more process blocks of FIG. 6 may be performed by another device or a group of devices separate from or including the storage device, such as a controller (e.g., controller 110).

As shown in FIG. 6, process 600 may include identifying a first estimation of a first expected error rate associated with a first portion of a storage medium and a second estimation of a second expected error rate associated with a second portion of the storage medium (block 610). For example, the storage device may identify a first estimation of a first expected error rate associated with a first portion of a storage medium and a second estimation of a second expected error rate associated with a second portion of the storage medium, as described above.

As further shown in FIG. 6, process 600 may include performing a first decoding operation, based at least in part on the first expected error rate, on a first data set associated with the first portion (block 620). For example, the storage device may perform a first decoding operation, based at least in part on the first expected error rate, on a first data set associated with the first portion, as described above.

As further shown in FIG. 6, process 600 may include performing a second decoding operation, based at least in part on the second expected error rate, on a second data set associated with the second portion (block 630). For example, the storage device may perform a second decoding operation, based at least in part on the second expected error rate, on a second data set associated with the second portion, as described above.

Process 600 may include additional implementations, such as any single implementation or any combination of implementations described below and/or in connection with one or more other processes described elsewhere herein.

In a first implementation, the first portion of the storage medium is associated with a first flash memory device, and wherein the second portion of the storage medium is associated with a second flash memory device.

In a second implementation, alone or in combination with the first implementation, the second decoding operation comprises delaying reading of the second data set, relative to the first decoding operation, based on the expected error rate.

In a third implementation, alone or in combination with one or more of the first and second implementations, process 600 includes reading a third data set before resuming reading the second data set.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In some implementations, a method performed by a controller of a negative-and (NAND) flash memory device includes initiating a read operation associated with a storage medium. The method also includes identifying a first estimation of a first expected error rate for a first data set stored on the storage medium and a second estimation of a second expected error rate for a second data set stored on the storage medium. The method includes performing a first decoding operation on the first data set based at least in part on the first expected error rate. The method includes performing a second decoding operation on the second data set based at least in part on the second expected error rate.

In some implementations, a system comprises: a controller, of a non-volatile memory device, arranged to initiate a read operation associated with a storage medium. The controller is also arranged to identify a first estimation of a first expected error rate for a first data set stored on the storage medium and a second estimation of a second expected error rate for a second data set stored on the storage medium. The controller is arranged to perform a first decoding operation on the first data set based at least in part on the first expected error rate. The controller is arranged to perform a second decoding operation on the second data set based at least in part on the second expected error rate.

In some implementations, a computer program product comprises one or more computer readable storage media, and program instructions collectively stored on the one or more computer readable storage media. The program instructions comprise program instructions to initiate a read operation associated with a storage medium. The program instructions also comprise program instructions to identify a first estimation of a first expected error rate for a first data set stored on the storage medium and a second estimation of a second expected error rate for a second data set stored on the storage medium. The program instructions comprise program instructions to perform a first decoding operation on the first data set based at least in part on the first expected error rate. The program instructions comprise program instructions to perform a second decoding operation on the second data set based at least in part on the second expected error rate.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the term "component" is intended to be broadly construed as hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the implementations. Thus, the operation and behavior of the systems or methods are described herein without reference to specific software code—it being understood that software and hardware can be used to implement the systems or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims or disclosed in the specification, these combinations are not intended to limit the disclosure of various implementations. In fact, many of these features may be combined in ways not specifically recited in the claims or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "or," unless explicitly stated otherwise (e.g., if used in combination with "either" or "only one of").

What is claimed is:

1. A method performed by a controller associated with a storage medium, the method comprising:

identifying a first estimation of a first expected error rate for a first data set read from the storage medium in response to an initiated read operation, the first estimation being based on a preliminary evaluation of the first data set in connection with an error correction code operation;

identifying a second estimation of a second expected error rate for a second data set read from on the storage medium, the second estimation being based on a preliminary evaluation of the second data set in connection with an error correction code operation;

determining that the first expected error rate is different from the second expected error rate;

performing a first decoding operation on the first data set based on the first expected error rate;

performing a second decoding operation on the second data set based on the second expected error rate, the second decoding operation being different from the first decoding operation based on determining that the first expected error rate is different from the second expected error rate; and performing, on the storage medium or on another storage medium, read scrubbing on at least one of the first data set or the second data set based on a threshold error rate, an actual first error rate of the first data set, or an actual second error rate of the second data set.

2. The method of claim 1, comprising:

indicating that the first data set or the second data set is to be read scrubbed based at least in part on performing the first decoding operation or the second decoding operation.

3. The method of claim 1, comprising:

performing read scrubbing on the first data set based at least in part on satisfaction of the threshold error rate by the actual first error rate of the first data set; or performing read scrubbing on the second data set based at least in part on satisfaction of the threshold error rate by the actual second error rate of the second data set.

4. The method of claim 1, comprising:

delaying performance of the second decoding operation on the second data set, relative to the first decoding operation, based at least in part on the second expected error rate, or delaying performance of the first decoding operation on the first data set, relative to the second decoding operation, based at least in part on the first expected error rate.

5. The method of claim 1, wherein the first decoding operation is associated with a first amount of decoding time or first complexity, and wherein the second decoding operation is associated with a second amount of decoding time or second complexity.

6. The method of claim 1, wherein the first expected error rate satisfies a first threshold, and wherein the second expected error rate satisfies a second threshold.

7. The method of claim 1, wherein the first decoding operation and the second decoding operation are selected from a set of multiple candidate decoding operations.

8. The method of claim 1, wherein the storage medium is associated with a solid state drive.

9. The method of claim 1, comprising:

providing the first data or the second data to an associated host device after decoding.

10. The method of claim 1, comprising:

performing a third decoding operation on a third data set before the second decoding operation based on the second expected error rate.

11. A system comprising:

a storage medium of a storage device; and a controller, associated with the storage medium, to:

identify a first estimation of a first expected error rate for a first data set read from the storage medium;

identify a second estimation of a second expected error rate for a second data set read from the storage medium;

perform a first decoding operation on the first data set based at least in part on the first expected error rate; and perform a second decoding operation on the second data set based at least in part on the second expected error rate, wherein the second decoding operation is a different type of decoding than the first decoding operation; and perform, on the storage medium or on another storage medium, read scrubbing on at least one of the first data set or the second data set based on a threshold error rate, an actual first error rate of the first data set, or an actual second error rate of the second data set.

12. The system of claim 11, wherein the controller is to identify a range of expected error rates associated with the first expected error rate, wherein performance of the first decoding operation is based on the range of expected error rates being associated with the first decoding operation.

13. The system of claim 11, wherein the first expected error rate satisfies a first threshold, and wherein the second expected error rate satisfies a second threshold.

14. The system of claim 11, wherein the first decoding operation is associated with a first amount of decoding time or first complexity, and wherein the second decoding operation is associated with a second amount of decoding time or second complexity.

15. The system of claim 11, wherein the controller comprises one or more of an application specific integrated circuit or firmware.

16. The system of claim 11, wherein the first decoding operation and the second decoding operation are selected from:

a hardbit decoding operation, a first softbit decoding operation, or a second softbit decoding operation.

17. A computer program product comprising:

one or more computer readable storage media, and program instructions collectively stored on the one or more computer readable storage media, the program instructions comprising:

program instructions to identify a first estimation of a first expected error rate associated with a first portion of a storage medium and a second estimation of a second expected error rate associated with a second portion of the storage medium;

program instructions to perform a first decoding operation, based on the first expected error rate, on a first data set associated with the first portion;

program instructions to perform a second decoding operation, based on the second expected error rate, on a second data set associated with the second portion; and program instructions to perform, on the storage medium or on another storage medium, read scrubbing on at least one of the first data set or the second data set based on a threshold error rate, an actual first error rate of the first data set, or an actual second error rate of the second data set.

18. The computer program product of claim 17, wherein the first portion of the storage medium is associated with a first flash memory device, and wherein the second portion of the storage medium is associated with a second flash memory device.

19. The computer program product of claim 17, wherein the second decoding operation comprises delaying reading of the second data set, relative to the first decoding operation, based on the second expected error rate.

20. The computer program product of claim 17, wherein the program instructions comprise:

program instructions to read a third data set before resuming reading the second data set.

* * * * *